United States Patent
Li et al.

(10) Patent No.: US 8,380,755 B2
(45) Date of Patent: Feb. 19, 2013

(54) ELECTRONIC READER CAPABLE OF RECORDING COMMENTS AND AMENDMENTS AND METHOD THEREOF

(75) Inventors: Hai-Sheng Li, Shenzhen (CN); Shang-Hui Pi, Shenzhen (CN); Jie Guo, Shenzhen (CN); Yue Zhang, Shenzhen (CN); Chih-San Chiang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 81 days.

(21) Appl. No.: 12/862,718

(22) Filed: Aug. 24, 2010

(65) Prior Publication Data
US 2011/0219041 A1 Sep. 8, 2011

(51) Int. Cl.
*G06F 7/00* (2006.01)
*G06F 17/30* (2006.01)
(52) U.S. Cl. .................................. 707/803; 707/812
(58) Field of Classification Search ........... 707/600–831
See application file for complete search history.

(56) References Cited

U.S. PATENT DOCUMENTS

| | | | | |
|---|---|---|---|---|
| 6,324,544 B1* | 11/2001 | Alam et al. | | 1/1 |
| 6,845,369 B1* | 1/2005 | Rodenburg | | 1/1 |
| 2003/0037302 A1* | 2/2003 | Dzienis | | 715/523 |
| 2006/0282499 A1* | 12/2006 | Tohma | | 709/203 |
| 2008/0019440 A1* | 1/2008 | Lee et al. | | 375/240.01 |

FOREIGN PATENT DOCUMENTS
CN 101206640 A 6/2008

OTHER PUBLICATIONS
Joeng Kim et al., An Application Streaming Service for Mobile Handheld Devices, 2006, IEEE, 323-326.*

* cited by examiner

*Primary Examiner* — Jean B Fleurantin
(74) *Attorney, Agent, or Firm* — Altis Law Group, Inc.

(57) ABSTRACT

An electronic reader includes a storage unit configured for storing files and a processor. The processor includes a file display control module, a first file creating module and a second file creating module. The file display control module is configured for obtaining and displaying the files opened by user input. The first file creating module is configured for creating temporary files recording the comments and the amended sections of the opened files in response to user input. Each of the temporary files corresponds to one of the opened files. The second file creating module is configured for combining contents of the temporary files into a file. The contents of the temporary files are arranged in the file according to a predetermined rule if the formats of the temporary files are the same.

9 Claims, 2 Drawing Sheets

ELECTRONIC READER CAPABLE OF RECORDING COMMENTS AND AMENDMENTS AND METHOD THEREOF

BACKGROUND

1. Technical Field

The present disclosure relates to electronic readers and, particularly, to an electronic reader capable of creating a file for recording comments and amendments and a method thereof.

2. Description of Related Art

Electronic readers are commonly known. Users can make comments on a file displayed on an electronic reader and amend the file. However, conventionally, the comments and the amended sections are stored together with the displayed file. Therefore, if the users want to look up the comments and/or the amended sections, the users have to open the file and search the comments and the amended sections in the file, which is time consuming. Especially, when the users want to look up the comments and/or the amended sections in more than one related file, the users have to open all those related files, and search the comments and/or the amended sections in each of the files, which is very tedious and time consuming.

Therefore, what is needed is an electronic reader capable of creating a file for recording edited sections and method thereof, alleviating the limitations described above.

BRIEF DESCRIPTION OF THE DRAWINGS

The components in the drawings are not necessarily drawn to scale, the emphasis instead being placed upon clearly illustrating the principles of an electronic reader capable of creating a file for recording amended sections and a method thereof. Moreover, in the drawings, like reference numerals designate corresponding sections throughout the several views.

DETAILED DESCRIPTION

Figure 1:
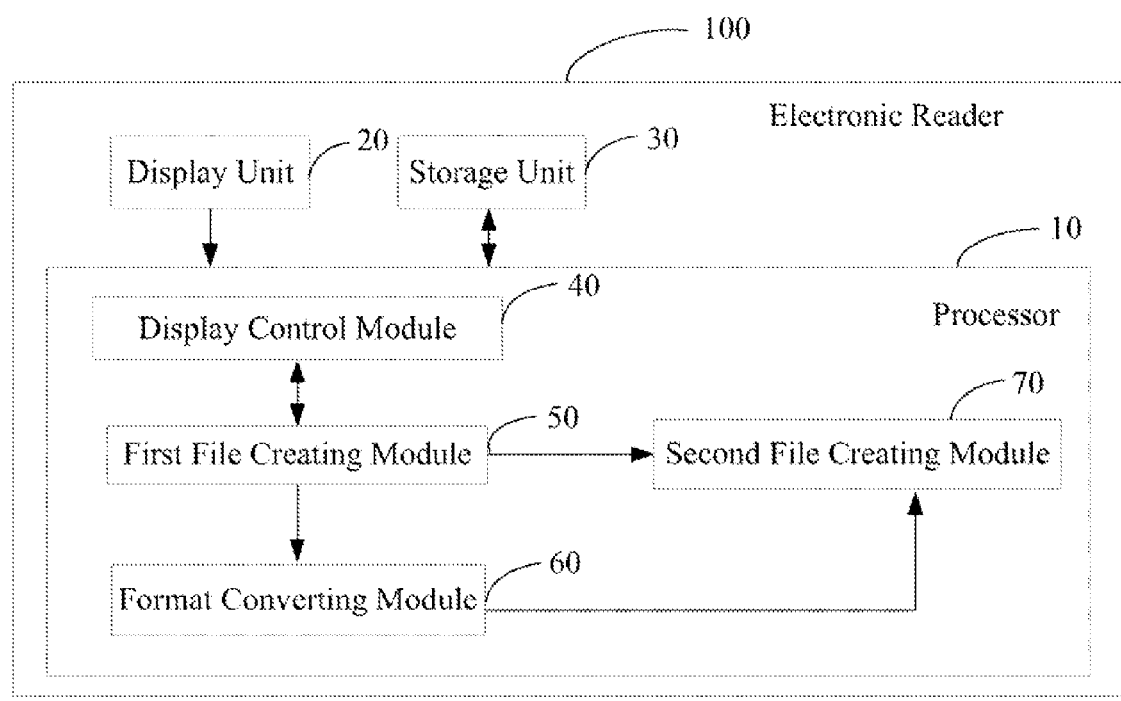
FIG. 1 is a block diagram of an electronic reader capable of creating a file for recording comments and amended sections in accordance with an exemplary embodiment.

Referring to FIG. 1, a block diagram of an electronic reader 100 is illustrated. The electronic reader 100 includes a processor 10, a display unit 20, and a storage unit 30. The storage unit 30 stores a plurality of files. The electronic reader 100 may be an electronic book, a mobile phone, or a digital photo frame.

The processor 10 includes a display control module 40, a first file creating module 50, a format converting module 60, and a second file creating module 70.

The file display control module 40 is configured for obtaining files from the storage unit 30 and displaying the files on the display unit 20 in response to user input.

The first file creating module 50 is configured for creating temporary files for recording the comments and the sections of the file associated with the comments and/or amended sections of the opened files in response to user input. The temporary files also record the creating time of the temporary files. Each of the temporary files corresponds to one of the opened files. In this embodiment, the format of the temporary file (e.g., DOC format, PDF format etc.) is the same as that of the corresponding opened file.

The format converting module 60 is configured for converting the temporary files to a predetermined format if the formats of the temporary files are not the same. The predetermined format may be the DOC format, PDF format, or the like.

The second file creating module 70 is configured for creating a file and combining contents of the temporary files into the file. The contents of the temporary files are arranged in the file in order according to the creating time of the temporary files.

With such a configuration, the comments and amended sections are recorded in a file, users can look up the comments and amended sections by opening the file, which conserves time.

Figure 2:
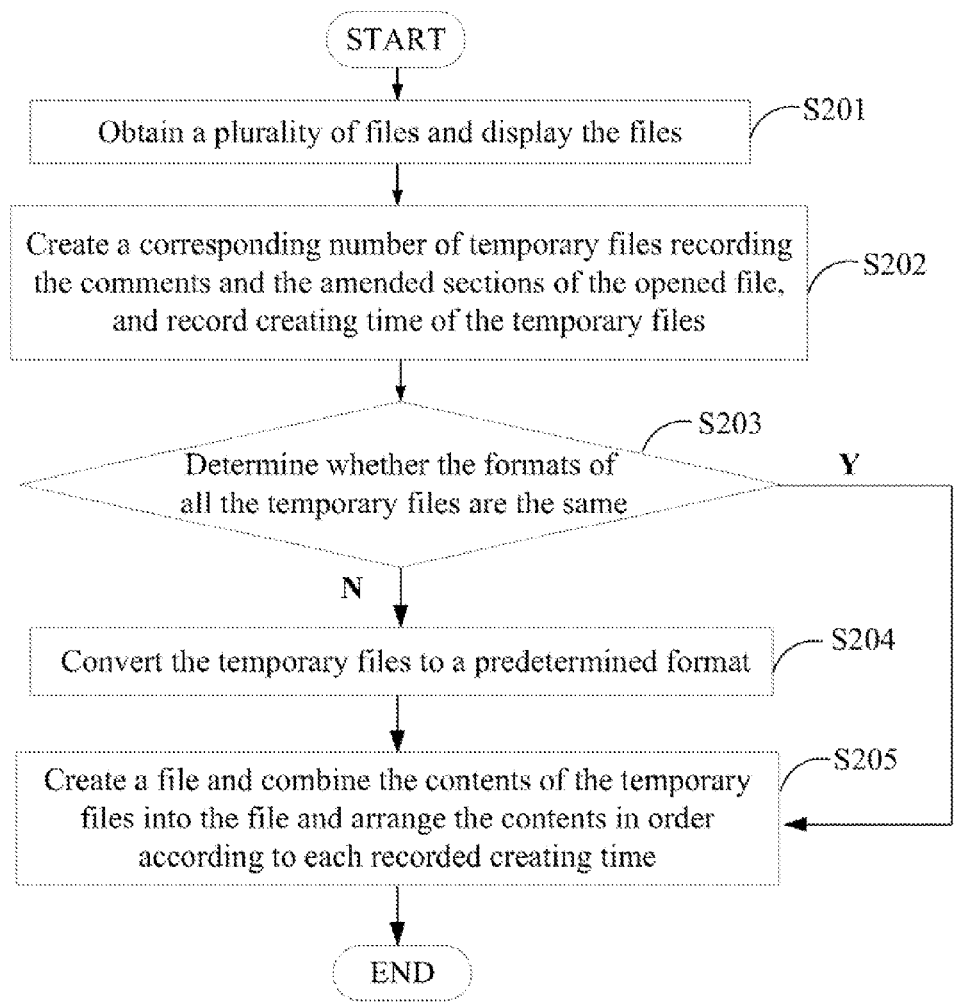
FIG. 2 is a flowchart of a method for creating a file for recording comments and amended sections in accordance with an exemplary embodiment.

Referring to FIG. 2, a flowchart of a method for creating a file for recording amended sections is shown. The method includes the following steps, each of which is tied to various components contained in the electronic reader 100 as shown in FIG. 1.

In step S201, the file display control module 40 obtains a plurality of files from the storage unit 30 and displays the files on the display unit 20 opened by user input.

In step S202, the first file creating module 50 creates a corresponding number of temporary files, each of the temporary file corresponds to one of the opened file and is provided for recording the comments and the amended sections of the opened file, The temporary files are also provided for recording creating time of the temporary files. In the exemplary embodiment, the format of each temporary file is the same to that of the corresponding opened file.

In step S203, the format converting module determines whether the formats of all the temporary files are the same. If the formats of all the temporary files are not the same, the procedure goes to step S204, otherwise the procedure goes to step S205.

In step S204, the format converting module 60 converts the temporary files to a predetermined format. The predetermined format may be DOC format, PDF format, or the like.

In step S205, the second file creating module 70 creates a file and combines the contents of the temporary files into the file, the contents of the temporary files are arranged in the file in order according to each recorded creating time.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic reader, comprising:
a storage unit configured for storing files; and
a processor comprising:
    a file display control module configured for obtaining and displaying the files opened by user input;
    a first file creating module configured for creating temporary files for recording comments on the opened files made by a user and sections of the opened files associated with the comments, each of the temporary files corresponding to one of the opened files;
    a second file creating module configured for combining contents of the temporary files into a file, the contents of the temporary files are arranged in the file in order according to creating time of the temporary files if the file formats of the temporary files are the same; and
    a format converting module configured for converting the temporary files to a predetermined file format if the file formats of the temporary files are not the same prior to the combination of the contents of the temporary files into the file.

2. The electronic reader as described in claim 1, wherein each of the temporary file is created to have the same file format as that of the corresponding opened file.

3. The electronic reader as described in claim 1, wherein the first file creating module is further configured for recording the creating time of the temporary files.

4. A method for creating a file for recording comments and sections of the opened files associated with the comments for an electronic reader, comprising:

creating temporary files recording comments on the opened files made by a user and sections of opened files associated with the comments in response to user input, each of the temporary files corresponding to one of the opened files;

combining contents of the temporary files into a file, the contents of the temporary files are arranged in the file in order according to creating time of the temporary files if the file formats of the temporary files are the same; and converting the temporary files to a predetermined file format if the file formats of the temporary files are not the same before executing the combining step;

recording the file combined with contents of the temporary files in a storage unit of the electronic reader.

5. The method as described in claim 4, wherein each of the temporary files further records the creating time of the temporary file.

6. The method as described in claim 4, wherein the file format of each of the temporary files is created to have the same file format as that of the corresponding opened file.

7. The method as described in claim 4, wherein the predetermined file format is selected from the group consisting of DOC format and PDF format.

8. An electronic reader, comprising:

a storage unit configured for storing files; and a processor comprising:

a file display control module configured for obtaining and displaying the files opened by a user;

a first file creating module configured for creating temporary files for recording comments on the opened files and sections of the opened files being commented, the comments on the opened files being added by the user, each of the temporary files corresponding to one of the opened files and having the same file format as that of the corresponding opened file;

a second file creating module configured for combining contents of the temporary files into a file, the contents of the temporary files arranged in the file in order according to creating time of the temporary files if the file formats of the temporary files are the same; and a format converting module configured for converting the temporary files to a predetermined file format if the file formats of the temporary files are not the same prior to the combination of the contents of the temporary files into the file.

9. The electronic reader as described in claim 8, wherein the predetermined file format is selected from the group consisting of DOC format and PDF format.

* * * * *

UNITED STATES PATENT AND TRADEMARK OFFICE
CERTIFICATE OF CORRECTION

| | |
|---|---|
| PATENT NO. | : 8,380,755 B2 |
| APPLICATION NO. | : 12/862718 |
| DATED | : February 19, 2013 |
| INVENTOR(S) | : Li et al. |

It is certified that error appears in the above-identified patent and that said Letters Patent is hereby corrected as shown below:

On the Title page, Item (30) should read:

(30)　　Foreign Application Priority Data

March 5, 2010　　(CN) ..........................2010 1 0118905

Signed and Sealed this
Fifteenth Day of October, 2013

Teresa Stanek Rea
*Deputy Director of the United States Patent and Trademark Office*